US008896421B2

(12) United States Patent
Kaplan

(10) Patent No.: US 8,896,421 B2
(45) Date of Patent: Nov. 25, 2014

(54) WIDE-AREA DYNAMIC RFID SYSTEM USING UWB

(75) Inventor: Gideon Kaplan, Kiryat Ono (IL)

(73) Assignee: Zebra Enterprise Solutions Corp., Oakland, CA (US)

( * ) Notice: Subject to any disclaimer, the term of this patent is extended or adjusted under 35 U.S.C. 154(b) by 1194 days.

(21) Appl. No.: 12/066,697

(22) PCT Filed: Sep. 28, 2006

(86) PCT No.: PCT/IL2006/001138
§ 371 (c)(1),
(2), (4) Date: Aug. 19, 2008

(87) PCT Pub. No.: WO2007/036940
PCT Pub. Date: Apr. 5, 2007

(65) Prior Publication Data
US 2010/0148925 A1    Jun. 17, 2010

Related U.S. Application Data

(60) Provisional application No. 60/721,986, filed on Sep. 30, 2005.

(51) Int. Cl.
*H04Q 5/22* (2006.01)
*H04M 15/00* (2006.01)
*G06K 7/10* (2006.01)
*G08B 13/24* (2006.01)

(52) U.S. Cl.
CPC ........... *H04M 15/00* (2013.01); *G06K 7/10306* (2013.01); *G08B 13/2402* (2013.01)
USPC ... 340/10.1; 340/10.2; 340/10.3; 340/539.13; 340/572.1; 340/572.2; 340/572.3; 340/572.4; 340/572.7; 340/572.8; 340/572.9; 340/573.1; 340/5.92; 235/375; 235/376; 235/377; 235/378; 235/379; 235/380; 235/381; 235/382; 235/382.5; 235/383; 235/384; 235/385; 700/215; 700/216; 700/217; 700/219; 700/220; 700/225; 700/226; 700/227; 700/228; 700/229; 700/230

(58) Field of Classification Search
CPC .......... G06K 7/0008; G06K 19/07749; G06Q 10/08; G06Q 10/087; G06Q 30/02; G07B 15/02; G07C 1/14; G07F 7/08; G07F 7/1008; G08B 13/2442; G08B 13/242; G08B 21/22; E05B 73/0017; B65G 43/10; B65G 61/00; B07C 1/00; B07C 3/00; B07C 3/18; G05B 19/41865
USPC ............ 340/539.1, 572.1–57.29, 573.1, 5.92, 340/10.1–10.3, 539.13, 572.1–572.9; 375/E01.002; 455/41.2; 235/375–385, 235/382.5; 700/215–235, 219–200
See application file for complete search history.

(56) References Cited

U.S. PATENT DOCUMENTS 5,388,101 A * 2/1995 Dinkins .......................... 725/62
5,455,575 A * 10/1995 Schuermann ................... 342/42
(Continued)

FOREIGN PATENT DOCUMENTS

WO    WO03/098528         11/2003
WO    WO-2005/043930 A2    5/2005
WO    WO 2005109348 A1 * 11/2005

OTHER PUBLICATIONS

"IEEE 802.15.4-2006" [online] [retrieved Jan. 4, 2011]. Retrieved from the Internet: <http://en.wikipedia.org/wiki/IEEE_802.15.4>. 4 pages.

(Continued)

*Primary Examiner* — Benjamin C Lee
*Assistant Examiner* — Quang D Pham
(74) *Attorney, Agent, or Firm* — Alston & Bird LLP

(57) ABSTRACT

A wide area radio frequency identification (RFID) system includes: a first RFID cell and a second RFID cell. The first RFID cell and the second RFID cell each include a reader and tags. The readers access the tags using ultra-wide band signaling. The RFID cells each include: a communications interface operable to communicate with a network operations center, and a communications gateway which supports direct communications between RFID cells. The method includes accessing the second RFID cell from the first RFID cell, and the accessing is performed using the communications gateway that can cover a range of at least five hundred meters.

15 Claims, 2 Drawing Sheets

(56) References Cited

U.S. PATENT DOCUMENTS

| | | | |
|---|---|---|---|
| 6,054,950 A * | 4/2000 | Fontana | 342/463 |
| 6,608,551 B1 * | 8/2003 | Anderson et al. | 340/10.51 |
| 6,633,223 B1 * | 10/2003 | Schenker et al. | 340/5.53 |
| 6,853,302 B2 * | 2/2005 | Monroe | 340/573.1 |
| 6,853,303 B2 * | 2/2005 | Chen et al. | 340/573.1 |
| 6,900,740 B2 * | 5/2005 | Bloomquist et al. | 340/905 |
| 6,927,688 B2 * | 8/2005 | Tice | 340/539.26 |
| 6,959,862 B2 * | 11/2005 | Neumark | 235/385 |
| 7,155,238 B2 * | 12/2006 | Katz | 455/456.1 |
| 7,280,520 B2 * | 10/2007 | Melville et al. | 370/338 |
| 7,289,815 B2 * | 10/2007 | Gfeller et al. | 455/456.1 |
| 7,589,616 B2 * | 9/2009 | Klatsmanyi et al. | 340/10.1 |
| 7,667,573 B2 * | 2/2010 | Ehrman et al. | 340/10.1 |
| 7,683,760 B2 * | 3/2010 | Ehrman et al. | 340/10.1 |
| 8,072,314 B1 * | 12/2011 | Kuzma et al. | 340/10.4 |
| 2001/0040513 A1 * | 11/2001 | McDonald | 340/825.49 |
| 2002/0065698 A1 * | 5/2002 | Schick et al. | 705/8 |
| 2003/0005160 A1 * | 1/2003 | Schaefer | 709/248 |
| 2003/0013146 A1 * | 1/2003 | Werb | 435/9 |
| 2003/0150908 A1 * | 8/2003 | Pokorny et al. | 235/375 |
| 2003/0216976 A1 * | 11/2003 | Ehrman et al. | 705/28 |
| 2004/0100376 A1 * | 5/2004 | Lye et al. | 340/539.12 |
| 2004/0100380 A1 * | 5/2004 | Lindsay et al. | 340/540 |
| 2004/0203377 A1 * | 10/2004 | Eaton et al. | 455/41.2 |
| 2005/0092825 A1 * | 5/2005 | Cox et al. | 235/375 |
| 2005/0198208 A1 * | 9/2005 | Nystrom | 709/219 |
| 2005/0208892 A1 * | 9/2005 | Kotola et al. | 455/41.2 |
| 2005/0248454 A1 * | 11/2005 | Hanson et al. | 340/539.26 |
| 2006/0002326 A1 * | 1/2006 | Vesuna | 370/328 |
| 2006/0068750 A1 * | 3/2006 | Burr | 455/343.1 |
| 2006/0103507 A1 * | 5/2006 | Forsberg | 340/10.51 |
| 2006/0105785 A1 * | 5/2006 | Gfeller et al. | 455/456.5 |
| 2006/0152369 A1 * | 7/2006 | Reunamaki | 340/572.1 |
| 2006/0158310 A1 * | 7/2006 | Klatsmanyi et al. | 340/10.1 |
| 2006/0181424 A1 * | 8/2006 | Graves et al. | 340/573.1 |
| 2006/0217093 A1 * | 9/2006 | Wang et al. | 455/136 |
| 2006/0246901 A1 * | 11/2006 | Sivakumar et al. | 455/436 |
| 2006/0267731 A1 * | 11/2006 | Chen | 340/10.1 |
| 2007/0040647 A1 * | 2/2007 | Saenz et al. | 340/3.1 |
| 2007/0045424 A1 * | 3/2007 | Wang | 235/462.46 |
| 2007/0046467 A1 * | 3/2007 | Chakraborty et al. | 340/572.1 |
| 2007/0049296 A1 * | 3/2007 | Gupta et al. | 455/456.5 |
| 2007/0050523 A1 * | 3/2007 | Emeott et al. | 709/248 |
| 2007/0103303 A1 * | 5/2007 | Shoarinejad | 340/572.1 |
| 2007/0139163 A1 * | 6/2007 | Powell et al. | 340/10.2 |
| 2008/0055085 A1 * | 3/2008 | Samboursky et al. | 340/572.1 |
| 2008/0061936 A1 * | 3/2008 | Park | 340/10.1 |
| 2008/0074263 A1 * | 3/2008 | Rofougaran | 340/572.1 |
| 2008/0079564 A1 * | 4/2008 | Shafer et al. | 340/539.1 |
| 2008/0186145 A1 * | 8/2008 | Manley et al. | 340/10.4 |
| 2008/0297312 A1 * | 12/2008 | Moshfeghi | 340/10.1 |
| 2009/0051490 A1 * | 2/2009 | Childress et al. | 340/5.92 |
| 2009/0292641 A1 * | 11/2009 | Weiss | 705/66 |

OTHER PUBLICATIONS

"Integrated Digital Enhanced Network" [online] [retrieved Jan. 4, 2011]. Retrieved from the Internet: <http://en.wikipedia.org/wiki/Integrated_Digital_Enhanced_Network>. 4 pages.

"Ultra-wideband" [online] [retrieved Jan. 4, 2011]. Retrieved from the Internet: <http://en.wikipedia.org/wiki/Ultra_wide_band>. 6 pages.

International Search Report and Written Opinion for corresponding International Appl. No. PCT/IL06/01138, mailed Jul. 16, 2008.

Duo et al., "A DC-13GHz LNA for UWB RFID Applications," *Proceedings from NORCHIP Conference*, Nov. 8-9, 2004, Oslo, Norway, pp. 241-244.

Extended European Search Report from related European Patent Appl. No. 06796134.2, mailed Aug. 12, 2010.

* cited by examiner

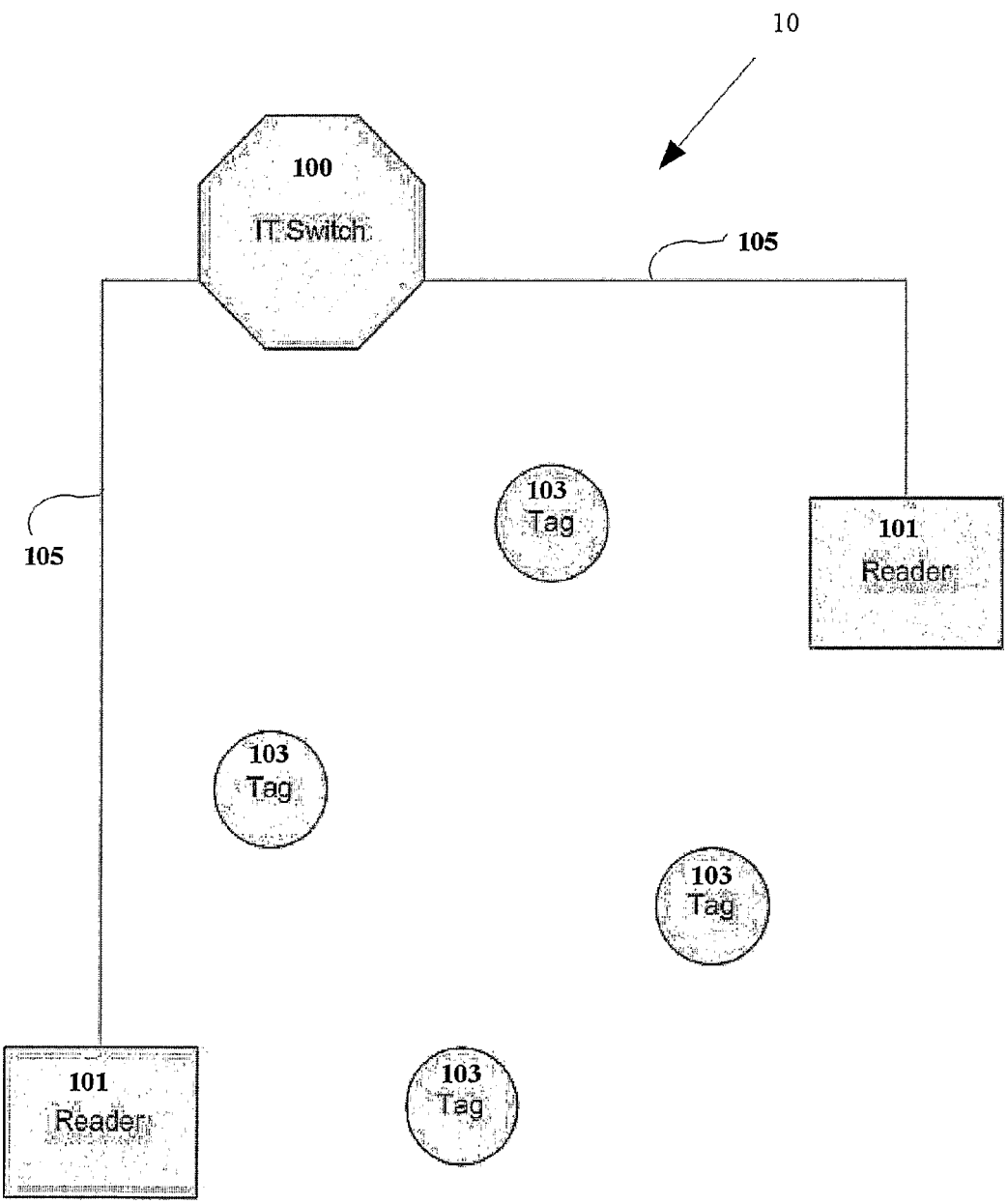
Fig 1. A (localized) RFID system
PRIOR ART

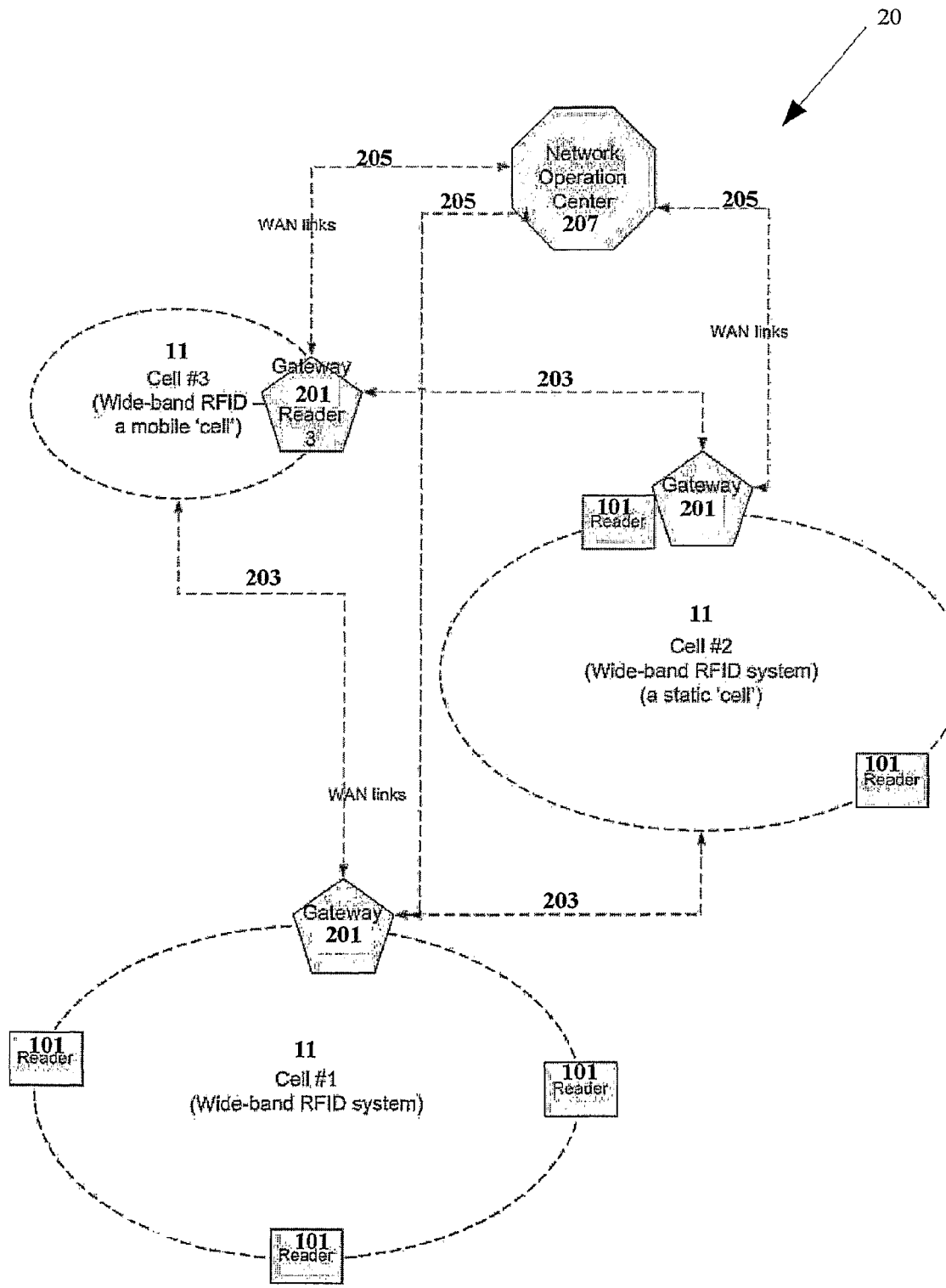
Fig 2. A wide-area RFID system using UWB ic RFID SYSTEM
USING UWB

TECHNICAL FIELD

The present invention relates to an RFID system including readers and tags, using ultra-wide band (UWB) communications between the readers and the tags, and the RFID system is managed over a wide area between RFID cells separated over a wide area, e.g. several kilometers or more. Specifically, the method includes communications links operable between RFID/UWB cells for transferring data between the cells.

BACKGROUND OF THE INVENTION

Radio Frequency IDentification (RFID) is a method of storing and remotely retrieving data using devices called RFID tags. An RFID tag is a small object that can be attached to a product, animal, or person. RFID tags receive and respond to radio-frequency queries from an RFID reader. RFID tags can be either active or passive. Passive tags require no internal power source, whereas active RFID tags have an internal power source, and typically have longer range and larger memories than passive tags.

An RFID system includes several components including mobile tags, tag readers, and application software. The RFID system enables a query to be received by the mobile tag and the tag responds with data. The data is received by an RFID reader and processed according to the needs of a particular application. The data transmitted by the tag may provide identification or location information, or specifics about the product tagged, such as price, color, date of purchase.

RF identification (RFID) systems are used to track objects, animals and/or people in a large range of applications. As an example, RFID is used to track books in a library. Security gates includes an RF transceiver as part of the RFID reader which detects whether or not a book has been properly checked out of the library. When the book returns, the tag attached to the book is detected and an appropriate record is updated in the library system. In another application, RFID readers previously located in a warehouse are used to identify certain objects (for example, on a track entering the warehouse), or to find the location of certain objects, by communicating with their tags and measuring the position of their tags.

A RFID system employs tags on various objects and readers of the tags in a given space. The main function of an RFID is to enable identifying the objects and possibly reading and writing data of the objects to and from the respective tags. Often the RFID system allows tracking the location of the objects via the respective tag location.

Ultra-wide band communications is particularly useful for determining distance and location of RFID tags. PCT International Patent Application Publication No. WO 2003/098528, (PCT Patent Application No. PCT/IL2003/00358), entitled "Method and system for distance determination of RF tags" is incorporated by reference for all purposes as if fully set forth herein. PCT/IL2003/00358 discloses an RFID system having the capability of automatically identifying unknown tags by sending a broadcast interrogation ultra wide-band (UWB) message signal and receiving responses from tags that receive the message signal.

As known in the art of RFID systems, the readers are devices which identify and store the data from the tags. The tags are attached to assets or materiel being managed. A major goal of an RFID system is to allow asset visibility to the organization and improve the organization's efficiency in asset tracking within different processes within the organization. The RFID system is a useful tool to obtain resource and location information for resource management or materiel management applications such as computer resource management (CRM) or Enterprise Resource Planning (ERP) applications running on interconnected computers within the organization. Typically the readers of the RFID system collect data originating in the tags, communicate and transfer the data with the resource management applications.

An RFID system 10 of the prior art is shown in FIG. 1 including readers 101 communicating with tags 103. Readers 101 are optionally connected to a conventional data switch 100 using Ethernet (e.g. 100BaseT) connections 105. RFID system 10 employing wide-band transmission can cover only limited areas, of typical dimension no more than several hundred meters. This is particularly the case for a RFID system employing ultra-wide band (UWB) communications networks using impulse transmission or otherwise complying with the definition of ultra wide (UWB) as approved by the FCC, or other wide-band communication methods.

Wide-band, low data rate systems (including RFID systems) fall under the category of personal area networks (PAN) and cover a limited area. In some cases, the low data rate systems include several readers that are used to cover the area, whereas tags 103 within this area can communicate with one or more readers 101 within the area. Information regarding tagged objects may be relayed between different RFID cells, according to the prior art from readers 101 through switch 100 to a wide area network such as the Internet to a network operations center (not shown).

In numerous cases, there exists a need to cover a wide area in which assets or objects may move. Due to the limited coverage capability of an RFID system employing UWB, other communications systems are required to achieve the coverage over the wide area. A conventional method for covering a wide area is disclosed in US application 20040203377 entitled, "Communication system for dynamic management of a plurality of objects and method therefor". In US patent application publication 20040203377, the objects are located within a large coverage area, and communicate their information to a central server. The objects may belong to dynamic groups controlled by group controllers. Another representative prior art reference is US patent application publication 2005/0248454 entitled "Marine Asset Security and Tracking System" as disclosed by Hanson et. al. Hanson et. al disclose a system using radio frequency identification (RFID) tags installed on containers. Multiple RFID readers are required, e.g. on ship, which relay information from the RFID tags to a site server installed on ship or in port. The site server relays information regarding the monitored containers via satellite link to a network operations center (NOC).

However, in many cases a central server or network operations center is not readily available either due to lack of worldwide coverage or insufficient capacity. In other cases, such as when the connection to a network operations center (NOC) requires the use of low earth orbit (LEO) satellites the satellite communication connection is very expensive.

There is thus a need for, and it would be highly advantageous to have a wide area dynamic RFID system using UWB which does not always require the use of a central server nor a network operations center (NOC) for communicating between one RFID/UWB cell to another RFID/UWB cell.

Other Prior Art:

US patent application publication 20050208892, Kotola et al., entitled "System and Method for remote service operation", provides techniques for the management of information regarding remote services. A remote service link is received across a short-range wireless communications network. The remote services may provide location-specific information regarding topics, such as weather forecasts, local dining and shopping, maps, transit schedules, etc. A mobile device may store and display information that allows a user to initiate service sessions with various remote service providers.

US patent application publication, 20050198208, S. Nystrom, "Accessing data in a short-range wireless communication network" describes a short-range communication system, including a transponder and mobile reader device that integrates information stored on a short range communications tag with information stored remotely at an external network resource. The user of a reader-associated device can access information stored on a short-range communication tag and information stored remotely at a network resource without incurring unnecessary delay. The system of US20050198208 includes a short-range wireless communication tag. The tag includes short-range wireless communication circuitry and a memory unit in communication with the circuitry. The memory unit stores local content information, e.g. Internet home page, and commands for concurrently effecting retrieval of supplemental content information, associated with the local content information from a remote network resource while the local content information is accessible to a remote wireless device.

DEFINITIONS

The term "ultra-wide band" (UWB) as used herein is defined (by FCC and ITU-R) in terms of a transmission from an antenna for which the emitted signal bandwidth exceeds the lesser of 500 MHz or 20% center frequency. Ultra-wide band (UWB) communication technology employs discrete pulses of electromagnetic energy that are emitted at, for example, picosecond to microsecond intervals. For this reason, ultra-wide band is often called "impulse radio." A UWB pulse is a single electromagnetic burst of energy. A UWB pulse can be either a single positive burst of electromagnetic energy, or a single negative burst of electromagnetic energy, or a series of pulses. Each pulse in a pulse-based UWB system occupies the entire UWB bandwidth, e.g. 3.1 to 10.6 GHz. thus having relative immunity to multipath fading (but not to intersymbol interference), unlike carrier-based systems that are subject to both deep fades and intersymbol interference.

Ref:http://en.wikipedia.org/wild/Ultra_wide band.

The terms "cell" or "RFID cell" as used herein is an RFID network using ultra wide band signaling over a limited area, typically up to a few hundred meters in dimension.

The terms "personal area network" (PAN) and "RFID cell" are used herein interchangeably.

The term "wide area" in the context of the present invention, refers to an area with typical dimensions of at least five hundred meters up to several kilometers or more. Coverage need not be contiguous over the wide area but rather only within the RFID cells in which the assets or tagged objects are located.

The terms "direct" or "directly" referring to communications between RFID cells without communicating through a network operations center.

The term "materiel" as used herein refers to the equipment and supplies in military and commercial supply chain management. In a military context, the term "materiel" relates to the specific needs of an army to complete a specific mission. Materiel in the context of commercial distribution includes items being transported by the services of or as the products of the business.

Integrated Digital Enhanced Network (iDEN) is a mobile telecommunications technology, developed by Motorola, which provides benefits of a trunked radio and a cellular telephone. iDEN places more users in a given spectral space, compared to analog cellular and two-way radio systems, by using speech compression and time division multiple access (TDMA). Notably, iDEN is designed to operate on narrow Specialized Mobile Radio (SMR) spectrum, rather than cellular frequencies. This necessitates the use of time division duplex, since SMR frequencies are unpaired. Up to six communication channels share a 25 kHz space; where analog two-way systems place only one channel in 12.5 kHz. (Ref:http://en.wikipedia.org/wild/Integrated_Digital_Enhanced_Network)

SUMMARY OF THE INVENTION

According to the present invention there is provided a wide area radio frequency identification (RFID) system including RFID cells. The RFID cells include readers and tags. The readers access the tags using ultra-wide band signaling. The RFID cells each include a communications interface operable to communicate with a network operations center, and a communications gateway operable to support direct communications between the RFID cells. The direct communications is over a range of at least five hundred meters. Typically, one or more of the RFID cells are located in a mobile vehicle. The ultra-wide band signaling is preferably operable to determine respective locations of the tags and to store the respective locations. The communications gateway preferably includes a cellular telephone communications interface and a cellular telephone operatively attached to or integrated with the reader. The communications gateway is operatively attached to a communications link using a communications technologies such as cellular communications, terrestrial radio communications, satellite communications, point-to-point microwave communications, infrared free space point-to-point communications, and free space point-to-point optical communications. The tags are attached to objects included in materiel of an organization, The objects are managed by a materiel management application accessible through the network operations center.

According to the present invention there is provided a method in a wide area radio frequency identification (RFID) system. The system includes a first RFID cell and a second RFID cell. The first RFID cell and the second RFID cell each include a reader and tags. The readers access the tags using ultra-wide band signaling. The RFID cells each include: a communications interface operable to communicate with a network operations center (NOC), and a communications gateway which supports direct communications between RFID cells. The communication interface to the NOC and the communication gateway, may be housed in the same device or in different devices. The method includes accessing the second RFID cell from the first RFID cell, and the accessing is performed using the communications gateway over a range of at least five hundred meters. Typically one or more of the RFID cells is located in a mobile vehicle. An RFID cell is capable of receiving a security alarm from another RFID cell. Transmissions from the RFID cell are optionally unicast, multicast and/or broadcast transmissions. A reader in one RFID cell can access a tag of another RFID cell, either by querying information from the tag; or by writing data to the tag; or the reader in the RFID cell accesses another reader of the other RFID cell. By virtue of ultra-wide band signaling, a reader in one RFID cell preferably maintains in storage locations of the tags in the RFID cell. The locations may be queried typically by a reader from the other cell.

BRIEF DESCRIPTION OF THE DRAWINGS

The invention is herein described, by way of example only, with reference to the accompanying drawings, wherein:

FIG. 1 is a prior art drawing of a conventional RFID cell; and

FIG. 2 is a drawing according to an embodiment of the present invention of a wide area RFID system using UWB.

DESCRIPTION OF THE PREFERRED EMBODIMENTS

The present invention is of a system and method of providing a wide area dynamic RFID system using UWB. Specifically, the system and method includes multiple RFID systems using ultra wide band (UWB) signaling between readers and tags 103 and information regarding tagged objects is transferred over relatively large distances between multiple RFID systems using communications links. A wide area RFID/UWB network is thus achieved which is preferably managed in a similar way to a single RFID cell. The communication links which allow mesh connectivity between RFID cells may be achieved using a cellular network, a satellite network, terrestrial radio, or point-to-point links such as microwave, infrared or optical links.

The principles and operation of a system and method of providing a wide area dynamic RFID system using UWB, according to the present invention, may be better understood with reference to the drawings and the accompanying description.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

By way of introduction, a principal intention of the present invention is to provide a wide area RFID network in which RFID cells are separated by large distances, e.g. several kilometers and information transfers between RFID cells using communications links between RFID cells. The information transfer between the RFID cells is performed using the communications links between the cells particularly when the central server or network operations center (NOC) is unavailable, e.g. no cellular coverage, or otherwise undesirable, e.g. too costly for frequent updates such as in the case of using a low Earth orbit satellite network. Another intention of some embodiments of the present invention is to reduce management overhead by managing the wide area RFID network much in the same way as if it were a single RFID cell. The wide area RFID network, according to embodiments of the present invention, maintains accurate location information regarding organizational or corporate assets i.e. tagged objects, using communications links between the cells. The wide area RFID network updates location information of the tagged objects, preferably only as required, e.g once per day or upon query through the network operations center to the enterprise resource management application. In this way, communications using the network operations center is minimized. Another intention of embodiments of the present invention is to increase security since multiple communications links need to be jammed to prevent the reader from transmitting an alarm.

The wide area RFID network, according to different embodiments of the present invention may include static RFID cells such as in a warehouse, or mobile RFID cells which include tagged objects in a truck, container, ship or airplane or a combination of mobile and static RFID cells. Similarly; the readers in different embodiments of the present invention may be immobile within a warehouse, at a vehicle entrance or docking points; or the readers may be mobile within trucks, ships, airplane and other vehicles. In other embodiments, different mobile cells may become sufficiently close, e.g. within 100 meters, to overlap and the tags of one cell may be accessed by the reader of another cell nearby using UWB signaling and synchronization.

Referring now to the drawings, FIG. 2 illustrates schematically a wide area dynamic RFID system 20 using UWB, according to embodiments of the present invention. Wide area RFID system 20 includes multiple RFID cells or PANS 11. In each PAN 11 there is gateway device 201 which connects to other cells 11 via connections 203. Gateway device 201 may be integrated with UWB reader 101 of the RFID system 10. Gateway device 201, is preferably accessible by query from network operations center 207 when a conventional WAN connection 205 is available. Gateway device 201 may be used to access readers 101 in the same cell 11, particularly when reader 101 is not accessible for some reason using conventional UWB signaling. In some embodiments of the present invention, gateway 201 is a mobile telephone such as cellular, e.g GSM, telephone or iDEN, since iDEN doesn't require a nearby base station to establish communications. In some embodiments of the present invention, UWB reader 101 is built into the same housing as the mobile telephone, enabling full RFID functionality within cell 11. Gateway device 201 and connection 203 may use any known type of communications known in the art including radio, free space point-to-point microwave, infrared or optical links.

In each PAN 11 of wide area RFID system 20, network topology and Media Access Control (MAC) protocols may be similar to those specified by IEEE 802.15.4 standard, or any other suitable protocol.

According to embodiments of the present invention, operation of wide area RFID network 20 using RFID operates using an innovative protocol. Wide area RFID network 20 protocol between RFID cells 11 preferably includes the following elements:

- A message (and response message) for identifying all objects in cell 'n';
- A read of data from object 'y' in cell number 'n';
- Write operation of data 'd' to object 'x' in cell 'n';
- Find location of object 'z' in cell number 'k';
- An outgoing (alert) message from one cell 11 to another cell 11 or to NOC 207: event 'eee' occurred in element 'w' of cell 'm' (or a security event, out of list of prescribed events).

In wide area RFID network 20, 'read' (object data or object ID), 'write' (object data) and 'locate' (an object) have both a local meaning (inside PAN 11) as well as a global meaning in wide area RFID network 20. Reader 101 in one RFID cell 11 may transmit a query for a tagged object in the same cell 11 or in another cell 11, by either an addressed unicast, multicast message or by a broadcast message. Reader 101 may also write data to a tagged object in local RFID cell 11 or in another RFID cell. Furthermore, reader 101 may be required to find the location of a tagged object, either in local RFID cell 11, or in another RFID cell 11 of wide-area network 20. The absolute (e.g. geographic) location of objects in any RFID cells 11, may be measured (such as using the teachings of WO 2003/098528) if the absolute location of readers 101 is known. In the case of a immobile RFID cell 11, the location of readers 101 is typically known a priori. Otherwise, the location of readers 101 may be determined for instance using an attached global positioning system (GPS). If the absolute location of reader 101 is not available, the location of a tagged object can be specified based on a relative location of one or more readers 101. In either case, the computation to determine location of tagged objects is performed locally or remotely over the wide area RFID network 20 using a centralized processing machine or server (not shown) preferably co-located with one of gateways 201.

The usage of wide area RFID system 20 may be further augmented for various combinations of local and global processes, for example:

Wide area RFID system 20 may support additional mechanisms of information transfer e.g. video transmission to the Network Operation Center 207, e.g. for emergency situations triggered by the occurrence of a local event. Wide area RFID system 20 may be used to synchronize processes in different PANs 11 very close to real time, e.g. by updating records, such as shipment dates or destinations written on tagged objects in one PAN 11, in response to an event in another PAN 11 or in response to the command of materiel management application.

When gateway 201 is a cellular telephone integrated with UWB reader 101, the cellular telephone has a network identification, is manually operable through a conventional keypad, or automatically places calls to NOC 207 or other gateways or responds to calls from NOC 207 or other gateways 201.

One application of the present invention is in the military theater. Typically, modern armies are required to maintain and secure weapon inventories. An RFID/UWB cell 11 is located in each weapons warehouse or truck carrying weapons. If one military unit requires weaponry from a second unit, a multicast (or broadcast) query may be placed over communications links 203 to locate the required weaponry from neighboring cells 11 of other military units.

In another application of the present invention, a telecommunications company in a modern city has several trucks with replacement parts, e.g. switches or circuit boards. One technician may require a replacement part which is not available on his truck. The technician performs a multicast query over communications links 10, to perform an inventory search in neighboring cells 11, e.g. trucks to locate the required part a nearby cell 11.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

While the invention has been described with respect to a limited number of embodiments, it will be appreciated that many variations, modifications and other applications of the invention may be made.

What is claimed is:

1. A wide area radio frequency identification (RFID) system comprising:

at least two RFID cells, wherein a first RFID cell includes a first reader and a first plurality of tags and a second RFID cell includes a second reader and a second plurality of tags, wherein the first reader is configured to access the first plurality of tags using ultra-wide band signaling and the second reader is configured to access the second plurality of tags using ultra-wide band signaling; and a network operations center having at least one communications interface in communication with at least one of the at least two RFID cells;

wherein the first RFID cell and the second RFID cell each include a communications gateway operable to support direct communications between at least the first RFID cell and the second RFID cell;

wherein, via the communications gateways of the first RFID cell and the second RFID cell, the first reader of the first RFID cell is configured to query data from, or write data to, a tag within the second plurality of tags of the second RFID cell;

wherein the second RFID cell is configured to receive a security alarm from the first RFID cell via the direct communications that is arranged over a range of at least five hundred meters; and wherein the first reader of the first RFID cell is configured to query data from, or write data to, a tag within the second plurality of tags of the second RFID cell in an instance in which the network operations center is unavailable.

2. The wide area RFID system, according to claim 1, wherein at least one of said at least two RFID cells is located in a mobile vehicle.

3. The wide area RFID system, according to claim 1, wherein said ultra-wide band signaling is operable to determine respective locations of a tag in either the first plurality of tags or the second plurality of tags and to store said respective location.

4. The wide area RFID system, according to claim 1, wherein said communications gateway includes a cellular telephone communications interface.

5. The wide area RFID system, according to claim 1, wherein said communications gateway includes a cellular telephone operatively attached to the first reader or the second reader.

6. The wide area RFID system, according to claim 1, wherein said communications gateway is operatively attached to a communications link selected from the group of communications technologies consisting of: cellular communications, terrestrial radio communications, satellite communications, point-to-point microwave communications, infrared free space point-to-point communications, and free space point-to-point optical communications.

7. The wide area RFID system, according to claim 1, wherein the tags of the first plurality of tags and the second plurality of tags are attached to objects included in materiel of an organization, wherein said objects are managed by a materiel management application accessible through the network operations center.

8. The wide area RFID system of claim 1, wherein the first reader of the first RFID cell is configured to query data from, or write data to, the tag within the second plurality of tags of the second RFID cell in an instance in which the readers are prevented from transmitting an alarm to the network operations center.

9. The wide area RFID system of claim 1, wherein the first RFID cell or the second RFID cell is a personal area network (PAN).

10. The wide area RFID system of claim 1, wherein, using the communications gateways of the first RFID cell and the second RFID cell, the first reader of the first RFID cell is configured to query data from and write data to a tag within the second plurality of tags of the second RFID cell.

11. The wide area RFID system of claim 1, wherein at least one tag within the second plurality of tags is not within range of the first reader of the first RFID cell and the first reader of the first RFID cell is configured to query data from, or write data to, the at least one tag within the second plurality of tags via the communications gateways of the first RFID cell and the second RFID cell.

12. A method for communicating between a first RFID cell and a second RFID cell in a wide area radio frequency identification (RFID) system, comprising:

querying data from, or writing data to, a tag within a second plurality of tags of the second RFID cell via a communications gateway operable to support direct communications between the first RFID cell and the second RFID cell, the querying or writing being performed by a first reader;

wherein the first RFID cell includes the first reader and a first plurality of tags and the second RFID cell includes a second reader and the second plurality of tags, wherein the first reader accesses the first plurality of tags using ultra-wide band signaling and the second reader accesses the second plurality of tags using ultra-wide band signaling;

wherein the wide area RFID system further comprises a network operations center having at least one communications interface in communication with at least one of the first RFID cell and the second RFID cell;

wherein the first RFID cell and the second RFID cell each include communications gateways operable to support the direct communications between the first RFID cell and the second RFID cell;

wherein the second RFID cell is configured to receive a security alarm from the first RFID cell via the direct communications that is arranged over a range of at least five hundred meters; and wherein the first reader of the first RFID cell is configured to query data from, or write data to, a tag within the second plurality of tags of the second RFID cell in an instance in which the network operations center is unavailable.

13. The method, according to claim 12, wherein the first RFID cell or the second RFID cell is located in a mobile vehicle.

14. The method, according to claim 12, wherein the querying or writing include sending a transmission from the first RFID cell, wherein said transmission is selected from the group consisting of unicast, multicast and broadcast transmissions.

15. The method, according to claim 12, wherein the second reader maintains in storage a plurality of respective locations of the second plurality of tags of the second RFID cell.

* * * * *